May 20, 1947.  W. A. PIPKIN  2,420,679
METHOD OF AND APPARATUS FOR EXTRACTING JUICE AND PEEL
OIL FROM WHOLE CITRUS FRUIT
Filed July 11, 1944   10 Sheets-Sheet 1

INVENTOR:
WILBUR A. PIPKIN
BY
ATTORNEY

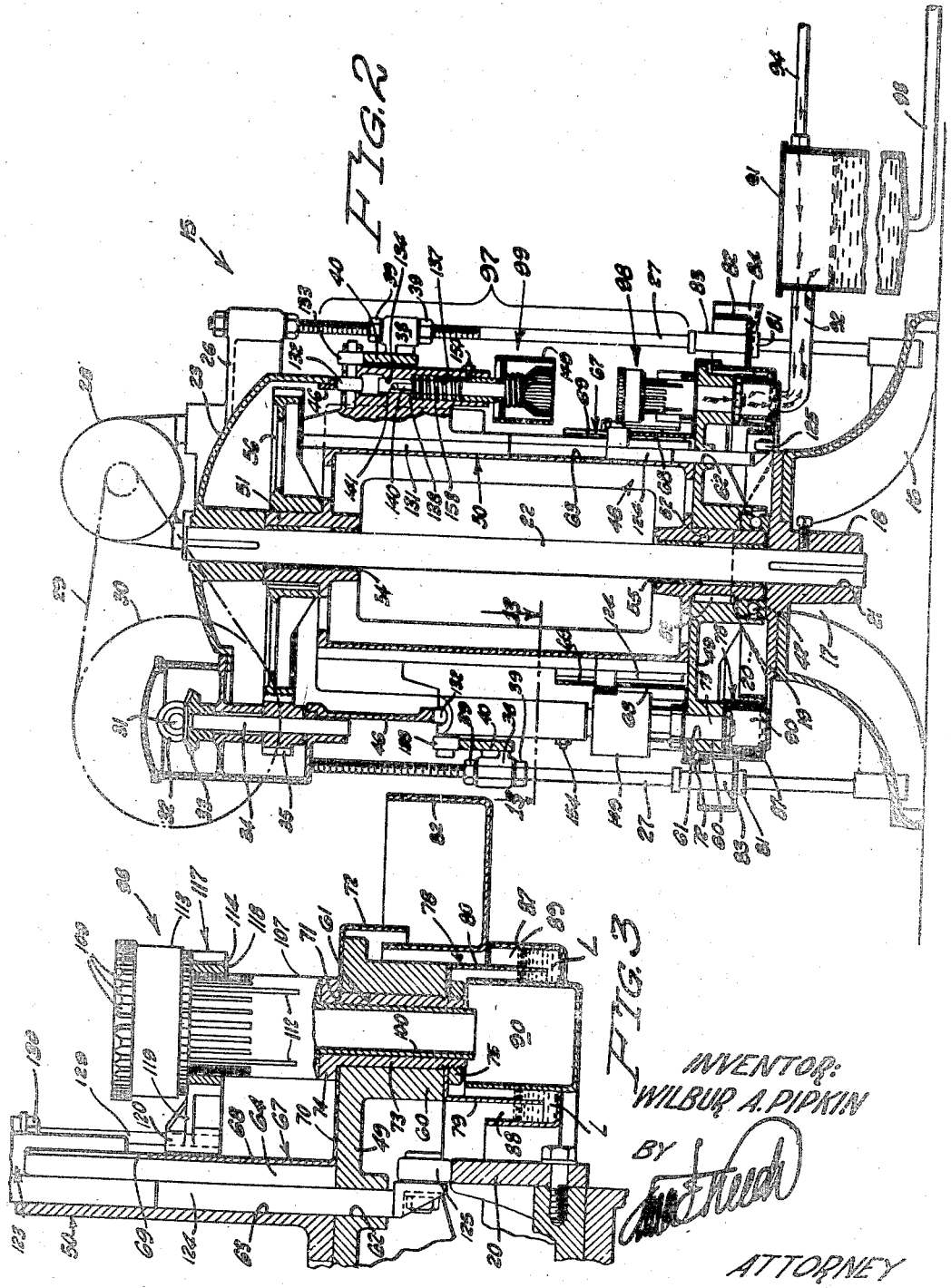

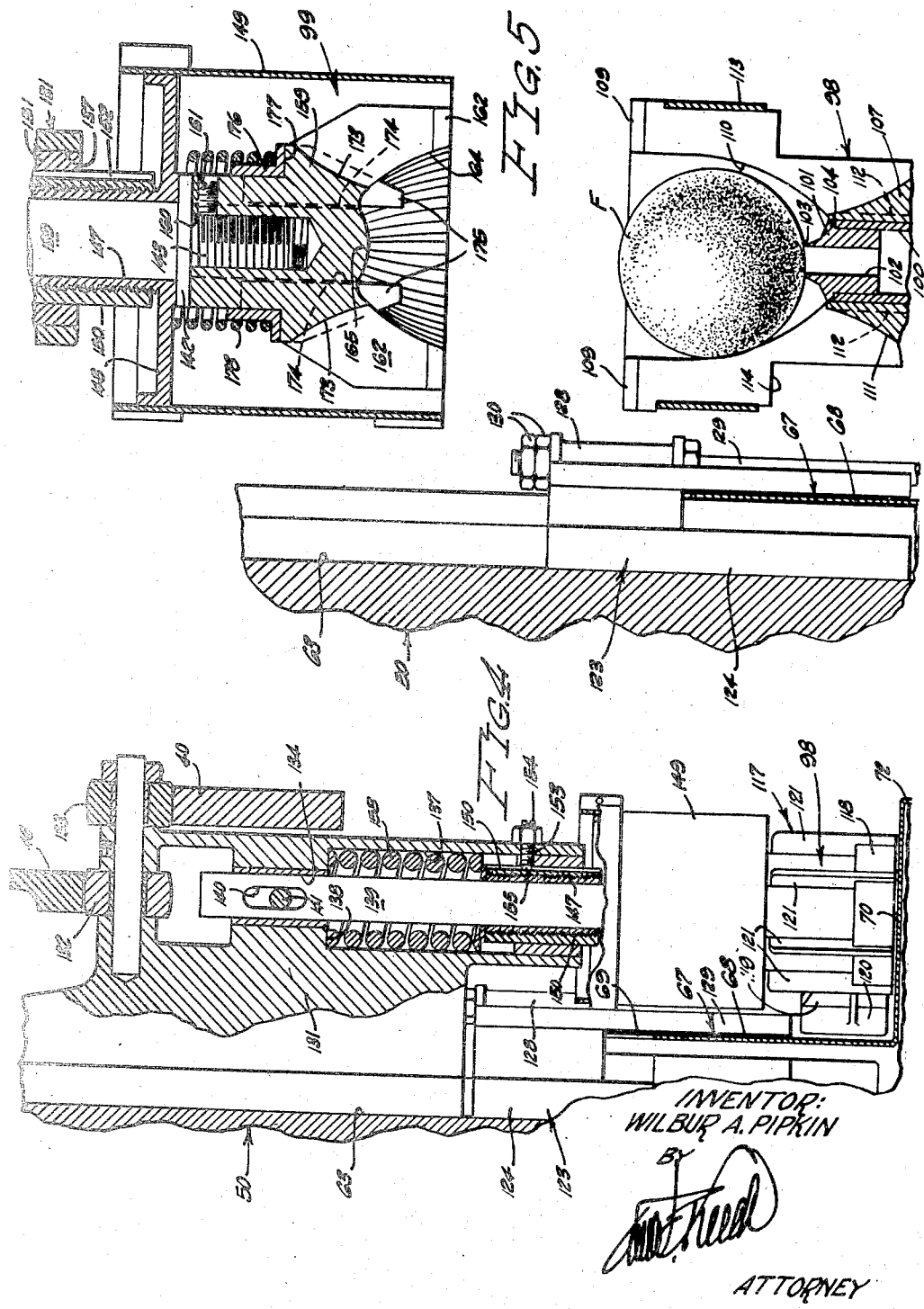

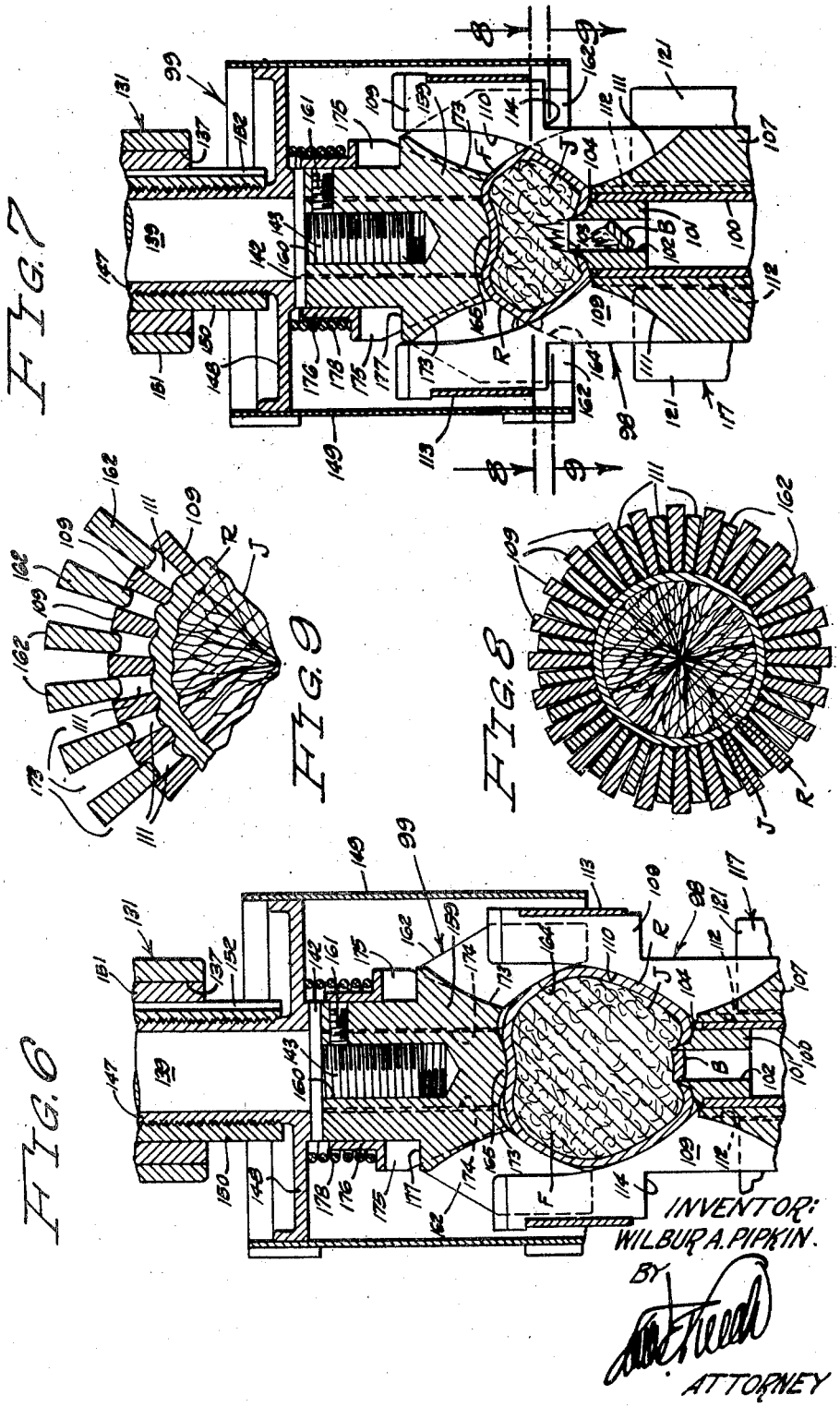

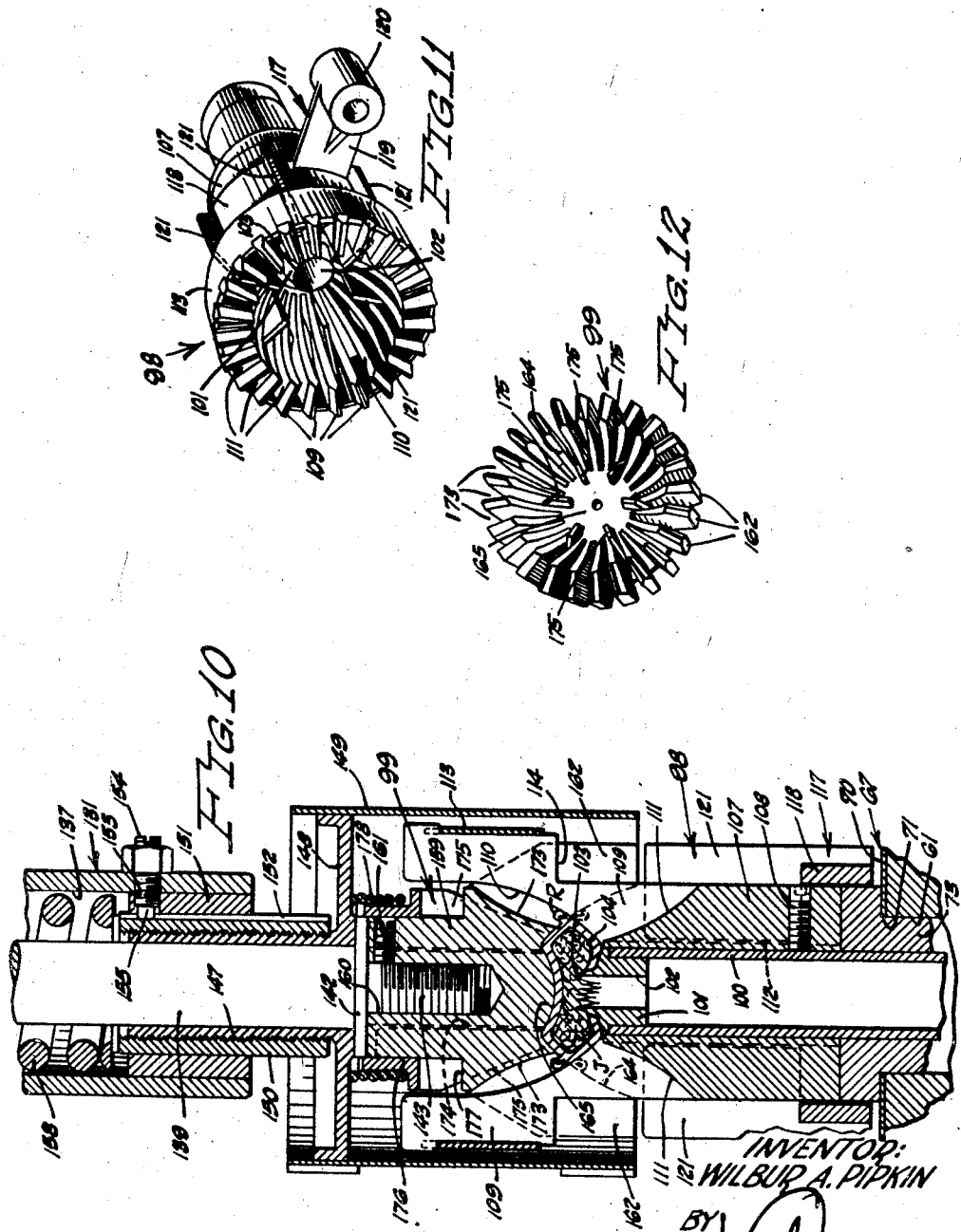

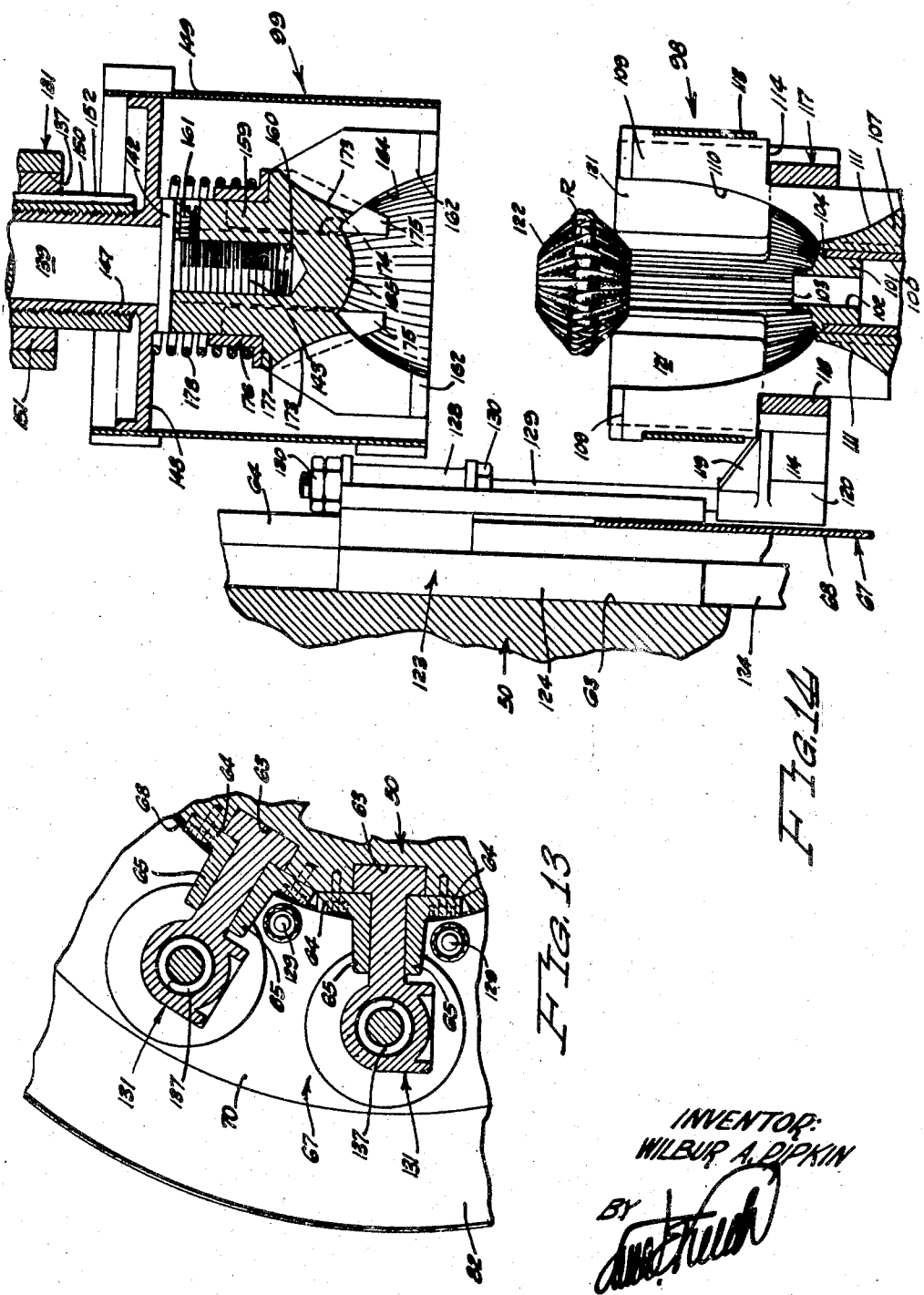

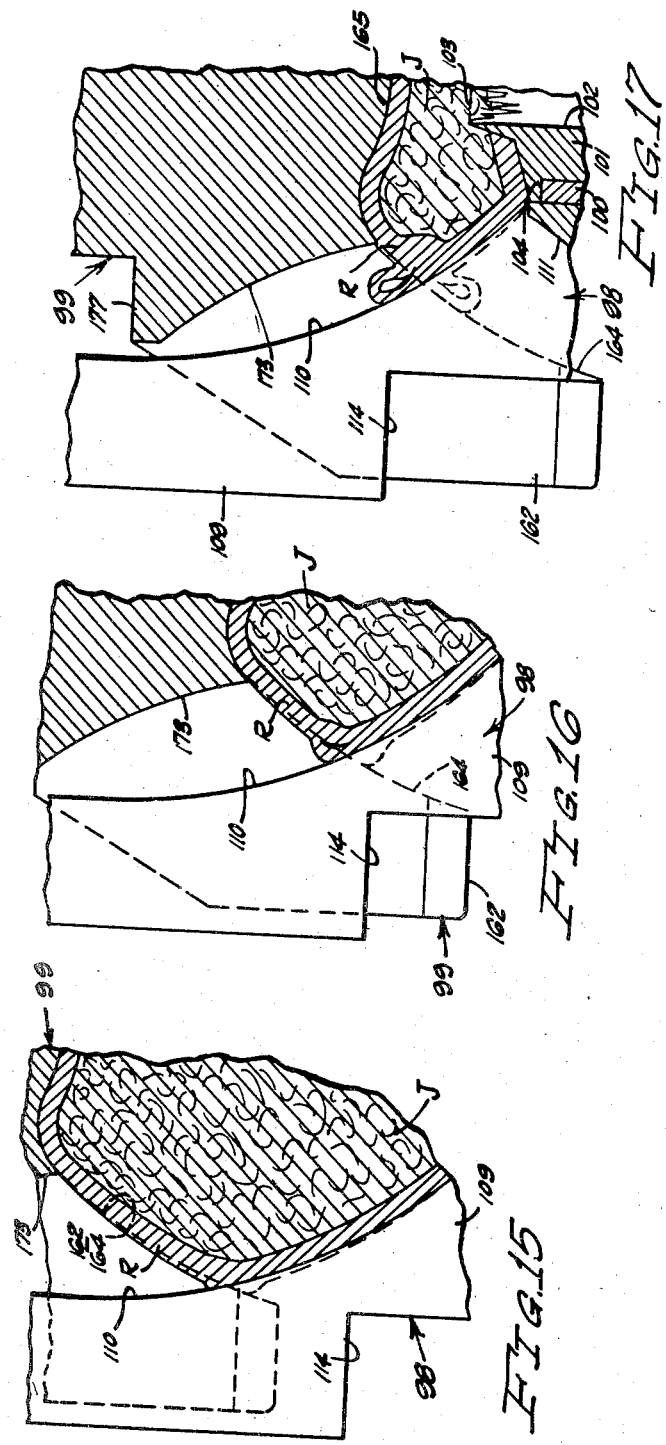

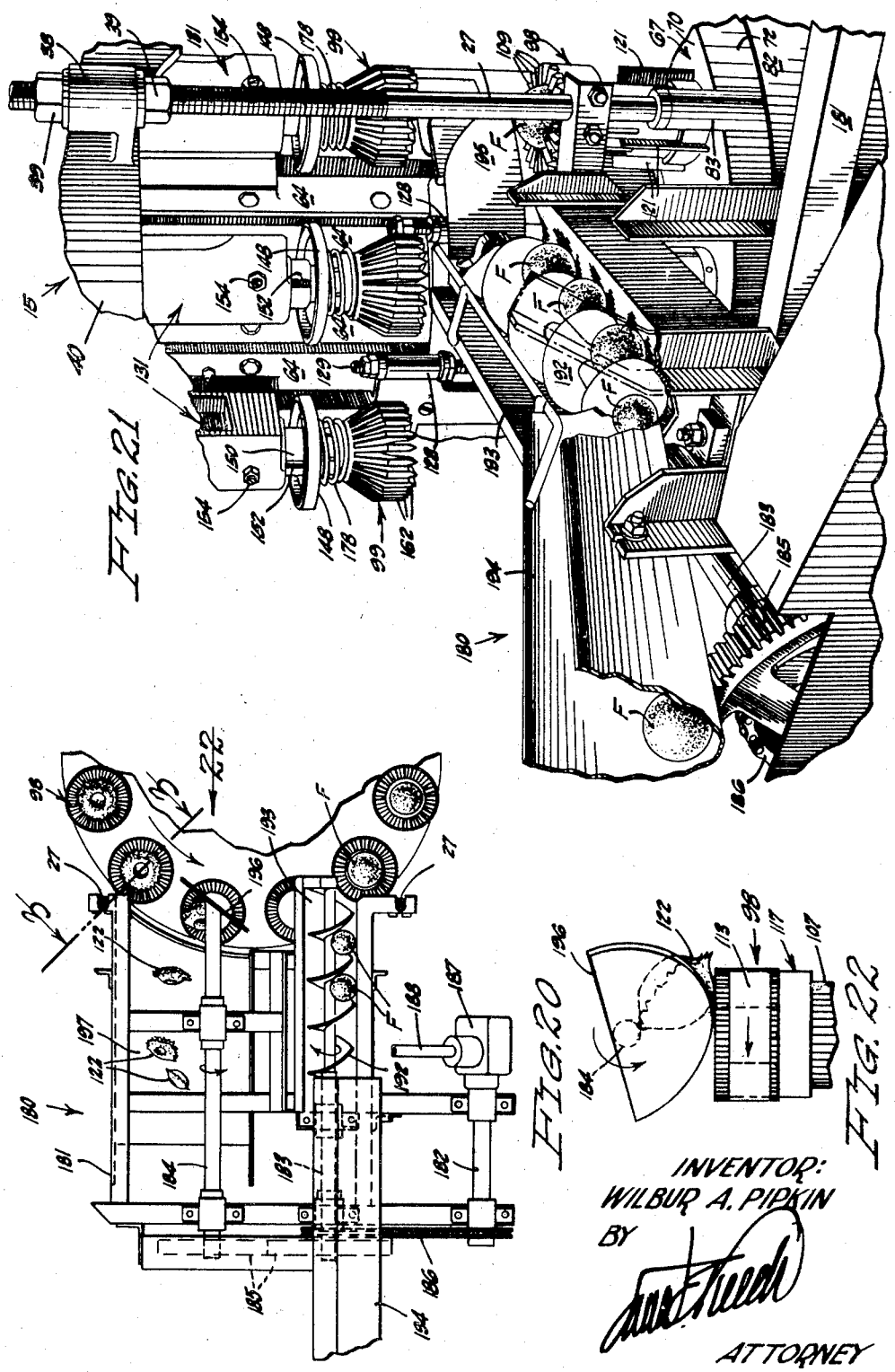

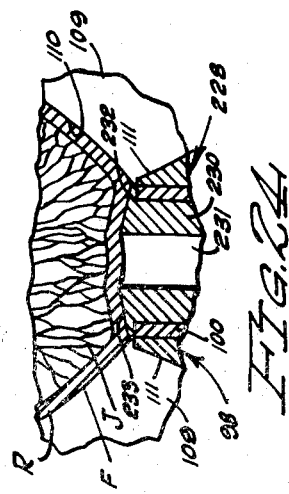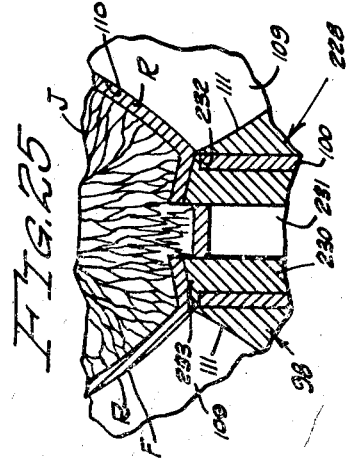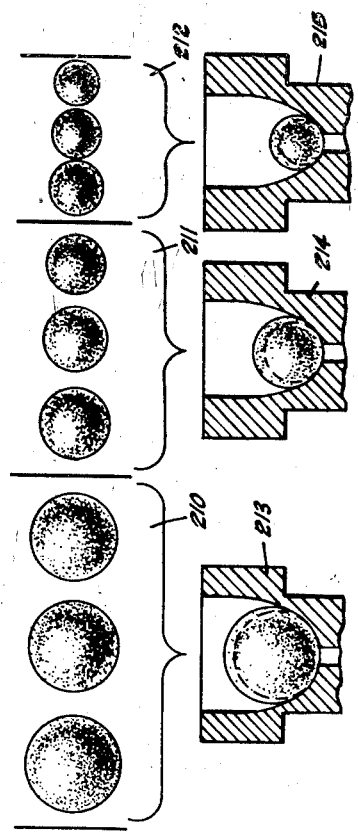

May 20, 1947.  W. A. PIPKIN  2,420,679
METHOD OF AND APPARATUS FOR EXTRACTING JUICE AND PEEL
OIL FROM WHOLE CITRUS FRUIT
Filed July 11, 1944   10 Sheets—Sheet 10
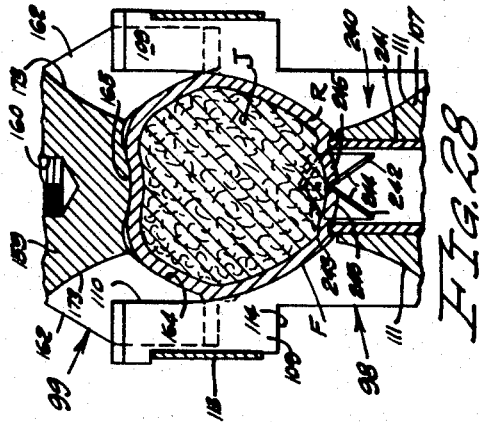
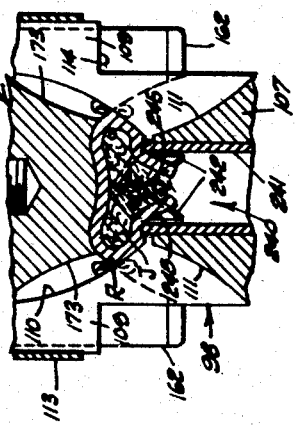
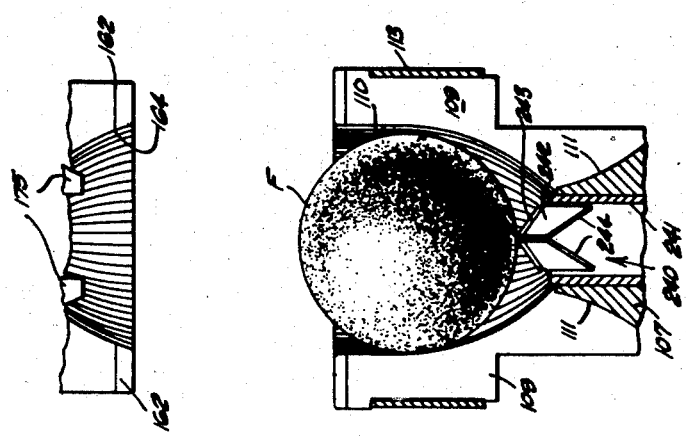
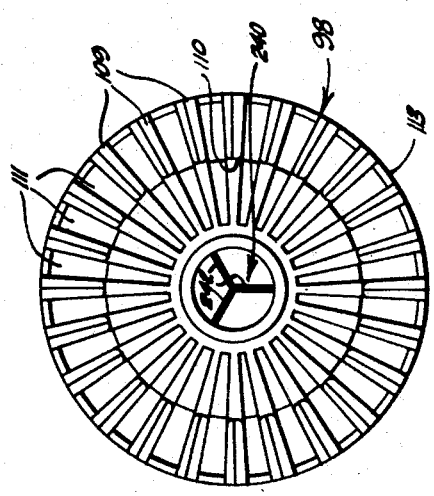
INVENTOR:
WILBUR A. PIPKIN
BY
ATTORNEY Patented May 20, 1947

2,420,679

UNITED STATES PATENT OFFICE 2,420,679

METHOD OF AND APPARATUS FOR EXTRACTING JUICE AND PEEL OIL FROM WHOLE CITRUS FRUIT

Wilbur A. Pipkin, Safety Harbor, Fla.

Application July 11, 1944, Serial No. 544,424

43 Claims. (Cl. 100—39)

This invention relates to the arts of extracting juice and peel oil from fresh citrus fruits and is especially useful in the extraction of juice and peel oil from whole oranges.

It is an object of my invention to provide a method of and apparatus for simultaneously expressing and separately recovering juice and peel oil from whole oranges.

It is a yet further object of the invention to provide such a method and apparatus which is capable of commercial operation to handle large quantities of fruit; to remove a relatively large percentage of the juice from the fruit; to practically keep the juice separate from the peel oil so that the juice contains a relatively small amount of oil; and to extract a substantial part of the peel oil from the rind of the fruit.

It is a still further object of the invention to provide such a method and apparatus in the practical operation of which, only a relatively small amount of juice is permitted to escape from the inside of the fruit to mingle with the oil.

In the preferred manner of carrying out the process of my invention, a whole citrus fruit is compressed between two cups having interdigitating fingers which apply pressure equally to all parts of the exterior of the surface of the fruit excepting a relatively small area through which a passage is formed to allow the escape of the juice. The pressure is so applied by said cups as to prevent bursting of the juice-bearing structure elsewhere than through said juice passage. When the cups are moved apart following the juice extraction operation, it is necessary to remove the carcass of the fruit from the cups.

It is another object of my invention to provide a novel means of ejecting the de-juiced carcass of a citrus fruit from the cups of such an apparatus following a juice extraction operation.

This application is a continuation in part of my co-pending application for U. S. Letters Patent Serial No. 458,011, filed September 11, 1942, for improvements in Citrus fruit juice extraction, which latter application was a continuation of application Ser. No. 318,197, filed February 9, 1940.

The manner of accomplishing the foregoing objects, as well as further objects and advantages, will be made manifest in the following description taken in connection with the accompanying drawings in which:

Fig. 2 is a diagrammatic vertical sectional view taken through the axis of the machine shown in Fig. 1.

Fig. 3 is an enlarged fragmentary detailed view taken on the line 3—3 of Fig. 20 and illustrating a means for sealing off the juice-receiving chamber from the atmosphere.

Fig. 4 is an enlarged vertical sectional view of an extraction unit of the apparatus in fruit compressing position.

Fig. 5 is a still further enlarged vertical sectional view of the upper and lower cups of an extraction unit as these are coming together for an extraction operation after an orange has been fed into the lower cup and before said cups enter inter-digitating relation.

Fig. 6 is a view similar to Fig. 5 and illustrates a further step in the extraction operation at the point where the fruit has been pressed against the hole-forming means to form a hole in the rind and the fruit almost compressed into conformity with the enveloping surfaces of the cups.

Fig. 7 is a view similar to Fig. 6 and illustrates a still further step in a juice and peel oil extracting operation in which a button is removed from the rind and the fruit is brought completely into conformity with the enveloping cup surfaces.

Fig. 8 is a horizontal sectional view of the cups shown in Fig. 7 taken on the line 8—8 of Fig. 7 which indicates the plane of inter-digitation of the two cups.

Fig. 9 is an enlarged fragmentary sectional view taken on the line 9—9 of Fig. 7 which indicates a plane disposed below the plane of inter-digitation, this view showing the bulging of the rind outwardly between adjacent fingers of the lower cup.

Fig. 10 is a view similar to Fig. 7 and illustrates the completion of the compression of a whole fruit in the juice and peel oil extracting operation.

Fig. 11 is a perspective view of a preferred embodiment of the lower compression cup employed in the invention.

Fig. 12 is a perspective view of a preferred embodiment of the upper compression cup employed in the invention.

Fig. 13 is an enlarged detailed horizontal sectional view taken on the line 13—13 of Fig. 2.

Fig. 14 is a view similar to Fig. 10 and illustrates a succeeding step in the operation of my invention in which the upper cup is lifted into upwardly spaced relation with the lower cup, the carcass of the whole fruit just operated upon is stripped downwardly from the upper cup and is then lifted upwardly from the lower cup into a position of readiness to be ejected from the machine.

Fig. 15 is an enlarged fragmentary vertical sectional operational view showing the reaction of the rind of the fruit to the compression cups shortly after the fruit comes into conformity with the enveloping surfaces of the compression cups.

Fig. 16 is a view similar to Fig. 15 showing the lower cup at the same level as this is shown in Fig. 15 but with the upper cup further depressed and illustrates the effect of the cup fingers rubbing against the outer portions of the rind adjacent the plane of inter-digitation of the cups.

Fig. 17 is a view similar to Fig. 16 and illustrates in detail the manner in which the rind of the fruit in some instances reacts to the cups at the final point of compression of the latter.

Fig. 18 is a side elevational view of an orange which has been removed from the cups after having been subjected only to a partial compression therebetween sufficient to form a hole in the rind and cause the fruit to conform completely to the enveloping surfaces of the cups as shown in Fig. 15.

Fig. 19 is a bottom plan view of the fruit shown in Fig. 18 and illustrates the clean hole formed in the rind by the apparatus.

Fig. 20 is a diagrammatic plan view of the fruit feed and carcass ejecting mechanism of the invention.

Fig. 21 is a fragmentary perspective view illustrating the feeding of the fruit to the machine.

Fig. 22 is a diagrammatic enlarged elevational view of the carcass ejector of the invention and is taken in the direction of the arrow 22 in Fig. 20.

Fig. 23 is a diagrammatic view illustrating the manner in which various sizes of fruit are divided into groups and a different size of compression cup employed for the fruit of each group.

Fig. 24 is a fragmentary vertical sectional view which illustrates a modified form of the hole-forming device of the invention comprising a hydraulic die and shows the fruit as with the rind pressed into conformity with the surface of the lower cup just before the hole is formed in the rind.

Fig. 25 is a view similar to Fig. 24 and illustrates the step following in which a button is hydraulically die cut from the rind to form a hole through which juice may be expressed.

Fig. 26 is a plan view of a lower cup embodying a second modified form of the hole-forming device of the invention which comprises three radial knives.

Fig. 27 is a vertical sectional view of a pair of compression cups initiating an extraction operation with the hole-forming device shown in Fig. 26 installed in the lower cup and a whole piece of fruit resting in the lower cup on said device.

Fig. 28 is a cross sectional view similar to Fig. 27 showing the cups pressing said piece of fruit on the knives of said device so as to form incisions in the rind producing a series of flexible rind tabs between the knives.

Fig. 29 is a view similar to Fig. 28 and illustrating the final compression of the orange with the rind tabs aforesaid bent downwardly by the pressure of the juice to form an opening through which the latter may escape.

Figure 1:
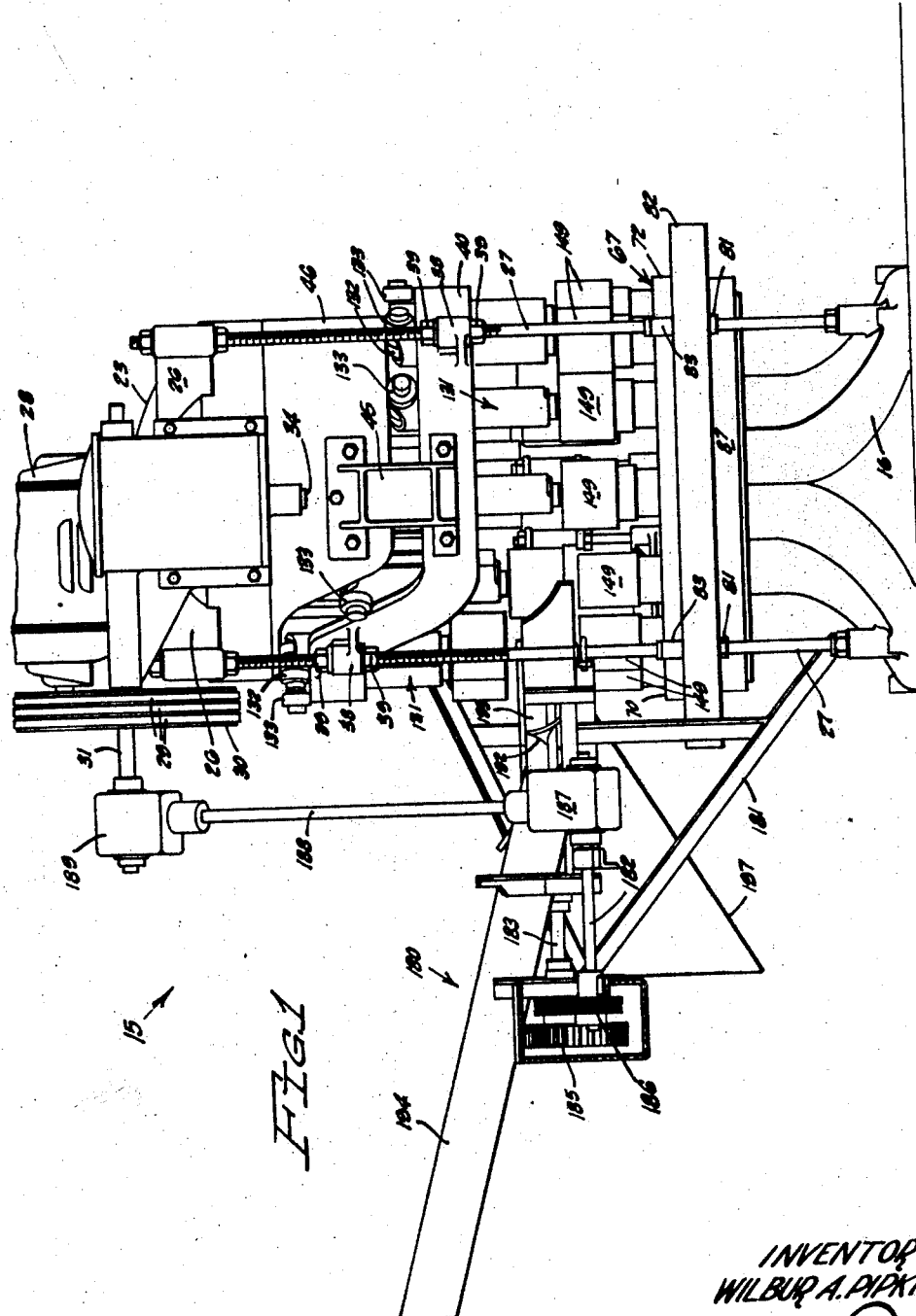
Fig. 1 is a side elevational view of a preferred embodiment of the apparatus of my invention.

Referring specifically to the drawings, the apparatus of this invention as shown therein, is embodied in a peel oil and juice extractor 15.

This includes a pedestal 16, a central opening 17 of which receives a boss 18 of a cap plate 19 having a cam wall 20. Fixed in a central bore 21 of the boss 18 is a shaft 22 to the upper end of which is fixed a head casting 23. The head casting 23 has arms 26 which are connected by rods 27 to the pedestal 16 to rigidly unite and properly space the pedestal 16 from the head casting 23. The head casting supports a motor 28 which is connected through belts 29 and pulley 30 to a shaft 31 which, through bevel-gears 32 and 33, rotates a shaft 34 carrying a master pinion 35.

Collars 38, surrounding the rods 27 and positioned vertically thereon by nuts 39, are formed integral with and support a lower annular cam 40. This cam is connected by brackets 45 to an upper cam 46 so that the upper cam is forced upwardly into assembled relation with the head casting 23. As shown in Figs. 1 and 2, the upper cam 46 is disposed inwardly from and concentric with the lower cam 40. Resting on the plate 19 is a thrust bearing 47 which supports the rotor 48 of the machine. This rotor includes a rotor platform 49 which rests directly on the bearing 47, a slideway cylinder 50 having upper and lower hub-like sleeves 51 and 52, the latter extending into the bearing 47 and being keyed to the platform 49 by a key 53. Sleeves 51 and 52 have bushings 54 and 55 which form bearings on the shaft 22. Mounted about the upper sleeve 51 and keyed thereto is a master gear 56 which meshes with the pinion 35.

The rotor platform 49 has an annular downward extension 60 near its outer edge which is provided with a series of 12 bores 61. Ejector stem guide holes 62 are provided in the platform, one of these being disposed close to each of the bores 61 and inwardly therefrom as shown in Figs. 2 and 3.

The holes 62 are formed in downward extension of and in alignment with slideways 63 provided in the cylinder 50. These slideways are given a T cross section (see Fig. 13) by slide gibs 64 secured to the outer face of the cylinder 50, these gibs having outward extensions 65 formed on upper portions thereof.

The platform 49 is provided with a stainless steel apron 67, having a cylindrical portion 68, which closely surrounds the lower portion of the cylinder 50 and is provided with slots 69 which register with the adjacent lower portions of the slideways 63. The apron 67 also includes a horizontal portion 70 which lies flat against the platform 49 and has holes 71 which register with the bores 61. Depending from the outer edge of the apron portion 70 is an annular lip 72.

Each of the bores 61 receives a sleeve 73 having an upper flange 74 and threadedly receiving a nut 75 at its lower end to secure this sleeve in said bore and thus hold the apron 67 rigidly in place on the platform 49. A sheet metal annulus 78 is provided, this having an inverted U cross section to provide downwardly extending walls 79 and 80, and holes which receive the lower ends of the sleeves 73 so that when the nuts 75 are tightened on the latter, the annulus 78 is united with the platform extension 60.

Supported on collars 81 on the rods 27 is an annular oil collecting trough 82 having sleeves 83, which surround the rods 27, and a discharge spout 84. Supported on the trough 82 or in any suitable manner is an annular juice-receiving trough 87, having concentrically united therewith troughs 88 and 89 into which the walls 79 and 80 extend downwardly. A liquid L is provided in these troughs to form liquid traps which maintain an air tight seal for excluding air from the juice-receiving chamber 90 within the trough 87.

Leading from the chamber 90 to a juice reservoir 91 is a tube 92. Also connecting with the reservoir 91 is a juice eduction pipe 93 and a gas supply pipe 94.

Mounted upon the rotor 48 is a series of extracting mechanisms 97, each of which includes a lower cup 98 and an upper cup 99, with suitable means for supporting and operating these. As all of the mechanisms 97 are identical, a description of one will suffice for all.

Illustrations of a lower cup 98 may be found in Figs. 4, 5, 10 and 11. This cup includes a stainless steel tube 100 which has a driven fit in one of the sleeves 73 so as to permanently fix the tube 73 in this sleeve. Mounted in the upper end of the tube 100 (see Figs. 5 and 10) is a button cutter 101 having a central passage 102, an annular knife 103 surrounding the upper end of this, and a sloping shoulder 104 which rests upon the upper end of the tube 100.

Surrounding the tube 100 where this extends above the sleeve 73 is a cylindrical cup body 107 having a set screw 108 which fixes this to the tube 100. Formed integral with the cup body 107 is a series of twenty-four elongated, narrow, closely-spaced fingers or teeth 109 which are circumferentially arranged in radial relation with the axis of the cup to form a cup bowl 110 at the bottom of which is located the button cutter 101. The fingers or teeth 109 are circumferentially thin and radially wide and are disposed flatwise to each other and edgewise to the bowl 110. Said fingers are separated by slots 111 which are slightly wider than the fingers themselves. Certain of the slots 111 are extended downwardly to form ejector slots 112. There are preferably twenty-four fingers 109 and slots 111 in each cup 98 and six of the ejector slots 112.

The fingers 109 may be reinforced as by an annular band 113 encircling the upper portion of the cup 98. The upper ends of the fingers 109 may be beveled as shown in Fig. 11 for a purpose to be made clear hereinafter. Fingers 109 preferably have notches 114 provided therein to extend the cylindrical character of the body 107 upwardly as shown in Fig. 10.

Each cup 98 has an ejector 117. This ejector includes a base ring 118 on which is fixed an actuating arm 119 having a long eye 120 at its outer end. The base ring 118 also has formed thereon a series of ejector blades 121, each of which lies in one of the ejector slots 112. Each ejector 117 is adapted to rest in a downward position in which it is shown in Fig. 10 or to be elevated into an upper position in which it is shown in Fig. 14. When lifted to the latter position, the blades 121 extend upwardly through the bowl 110 of the cup 98 to lift a carcass 122 of an orange upwardly out of this bowl.

Vertically slideable in a lower portion of the slideway 63 (see Fig. 14) adjacent each of the cups 98 is a T-head 123 having a shank 124 which extends downwardly through the slideway 63 and hole 62 in alignment therewith, this shank having a roller 125 mounted on its lower end so that this roller is in vertical alignment with the cam wall 20. The T-head 123 has a long eye 128 formed integral therewith, there being a rod 129 which screws into suitable threads provided in the eye 120 and also extends through the eye 128 and is secured in a given vertical relation therewith by nuts 130.

The cam 20 lifts each roller 125 as the rotor 48 rotates to shift the ejector 117 associated therewith from its lowermost position as shown in Fig. 6 to its uppermost position as shown in Fig. 14 and back again to its lowermost position. The period wherein this takes place will be pointed out hereinafter. When each of the T-heads 123 thus reciprocates, it extends through one of the slots 69 in the cylindrical portion 68 of the apron 67. (See Figs. 2 and 3.)

Illustrations of the upper cup 99 may be found in Figs. 2, 6, 7, 10 and 12. Each of these cups is mounted on a T-head 131 sliding in an upper portion of one of the slideways 63. This T-head 131 has a pair of cam follower rollers 132 and 133, the first of these following upper cam 46 and the other following lower cam 40. (See Figs. 1 and 4.)

The T-head 131 has a vertical bore 134 which is disposed in vertical alignment with the roller 132 and which has a counterbore 137, at the upper end of which, is a shoulder 138. Slideable in the bore 134 is a cup stem 139 in the form of a shaft having an eye slot 140, there being a pin 141 mounted in the head 131 and extending through said slot to permit a limited degree of vertical movement of the stem 139 relative to the head 131.

The lower end of the stem 139 (see Fig. 14) has an annular flange 142 and a threaded nipple 143 extending axially downward therefrom. Surrounding the stem 139 and resting downwardly on the flange 142 is a tube 147 having a housing head plate 148 flaring outwardly therefrom and carrying a cylindrical housing shell 149. The tube 147 is externally threaded and has screwed thereon a bushing 150 having a longitudinal groove 152 cut therein. Secured in the lower end of bore 137 so as to slideably receive the bushing 150 is a bushing 151. Screwed into a threaded hole 153, formed in the wall of the bore 137 and in the bushing 151, is a screw 154 having a guide tit 155 provided on its inner extremity, this tit extending into the guide groove 152 of the bushing 150. Trapped in the counterbore 137 between the upper end of the bushing 150 and the shoulder 138 is a heavy coiled expansion spring 158.

The upper cup 99 (see Figs. 10 and 12) also includes a cup body 159 having a threaded bore 160 into which the nipple 143 screws to assemble the body 159 on the stem 139. The body is held in this assembled relation by a set screw 161. The body 159 has a series of twenty-four elongated, narrow, closely-spaced fingers or teeth 162 formed integrally therewith and spaced circumferentially in radial planes with respect to the axis of the cup 99. The inner surfaces of the fingers 162 are shaped to form an inverted bowl 164, the bottom 165 of which may be concave, or flat, or it may be convex as shown in Figs. 5 and 6. I have found it preferable, however, to make this convex, as shown, for reasons that will be pointed out hereinafter. The fingers 162 are separated by slots 173 which are slightly wider than the fingers.

Certain of the slots 173 are deepened to form slots 174 in which ejector blades 175 are slideably disposed. These blades are united by a collar 176 which is slideably mounted on the body 159 and is pressed against a shoulder 177 thereof by an expansion spring 178. When the collar 176 is thus yieldably held downward, the ejector blades 175 extend downwardly into the upper cup bowl 164 as shown in Fig. 5.

In each of the mechanisms 97 the upper and lower cups 99 and 98 are co-axial and the upper cup body 159 is so mounted on the stem 139 that the slots 173 of the upper cup are in alignment with the fingers 109 of the lower cup while the fingers 162 of the upper cup are in alignment with the slots 111 of the lower cup. The fingers of the upper and lower cups thus by-pass each other in inter-digitating relation when the upper cup 99 is lowered as shown in Fig. 6.

The juice extractor 15 has a whole fruit feed and carcass removing mechanism 180 (see Figs. 1 and 20) which includes a frame 181 provided with suitable bearings in which shafts 182, 183 and 184 are journalled. The shafts 183 and 184 have meshing gears 185 which cause these shafts to rotate in opposite directions as indicated by the arrows on these shafts in Fig. 20. Shafts 182 and 183 have a chain and sprocket connection 186 and the shaft 182 is connected, through gears 187, a shaft 188 and gears 189, to the shaft 31 whereby the mechanism 180 is driven from the motor 28.

The shaft 183 extends toward the machine 15 and into the space separating the upper and lower cups of the extracting mechanisms 97 when the upper cup 99 is elevated as shown in Fig. 21. This shaft is provided with a feed screw 192 and this screw is surrounded by a sheet metal trough 193 into which fruit is fed by gravity through a chute 194 and which guides fruit propelled by the screw 192, as the latter rotates with the shaft 183, until this fruit is discharged from trough 193 and allowed to fall downwardly into one of the lower cups 98. A sheet metal deflecting wall 195 is disposed opposite the inner end of the trough 193 to prevent whole fruit fed inwardly from the trough from overshooting an adjacent lower cup 98.

The inner end of the shaft 184 extends to a point intercepting the axes of the extracting mechanisms 97 as the latter rotate with the rotor 48. Mounted obliquely on the inner end of the shaft 184 is a substantially semi-circular carcass removing blade 196 (see Figs. 20 and 22) which is rotated by the shaft in such timed relation with the rotation of the rotor 48 as to engage each carcass 122 as it travels supported on the ejector blades 121 (see Fig. 14) and throws this outwardly from the machine so that it drops in a chute 197 provided to receive this.

Operation

Before commencing juice extracting operations with the machine 15, the pipe 94 may, if desired, be provided with a continuous supply of inert gas such as carbon dioxide or nitrogen. This gas flows into reservoir 91, pipe 92 and into the chamber 90 and tubes 100, drives the atmosphere from all these, and completely fills them with gas. This gas then starts escaping upwardly from the tubes 100 into the lower cups 98.

A supply of fresh whole fruit such as oranges F is now fed to the machine through the chute 194. The motor 28 being energized, the rotor 48 is rotated by the pinion 35 engaging the master gear 56, this being preferably at about 25 R. P. M. The fruit feeding and carcass removing mechanism 180 is, of course, driven in timed relation with the rotor 48 so that the whole fruit received through the chute 194 is fed one piece at a time into the lower cups 98 as these come underneath the discharge end of feed trough 193.

When the lower cup of each extraction mechanism 97 thus receives a fresh whole fruit such as an orange F, the upper cup thereof is in elevated position due to the roller 133 thereof riding on the high portion of the lower cam 40. At this time, the ejector roller 125 of this extraction mechanism has rolled downwardly onto the lower portion of the cam 20 (see Fig. 2) so that the ejector 117 thereof is disposed in lower position as shown in Fig. 10. The bowl 110 of the lower cup 98 is thus unobstructed and readily receives the fruit as shown in Fig. 5. Almost immediately thereafter, the roller 132 of this mechanism is forced downwardly by engagement with the upper cam 46 causing the upper cup 99 to move downwardly into inter-digitating relation with the lower cup 98. The piece of fruit F therein is thus surrounded by the fingers of the two cups and compressed as shown in Figs. 6, 7 and 10 by a continuous and very rapid reduction in the space in the combined bowls 110 and 164 of the two cups.

As the cups come together on this piece of fruit, the pressure between the fruit and the blades 175 in the upper cup prevent further downward movement of these blades with the upper cup, so that these blades are retracted relative to the upper cup and the spring 178 compressed as shown in Fig. 6. The initial compression of the fruit between the cups also impales the fruit on the annular knife 103 so as to cut a button B from the rind of the fruit. This is forced through the passage 102 of the knife element 101 (Fig. 6) as the increase of pressure against the outer surface of the fruit breaks down the inner juice structure and compels the juice therein to escape outwardly through the passage 102.

The trapping of a fresh whole fruit in this manner between the upper and lower cups of an extraction mechanism 97 applies pressure to all portions of the fruit outside the area from which a button is cut by the knife 103, this pressure being applied in such a uniform manner that the juice-bearing structure J is unable to burst through the rind R and practically all the juice in the orange is therefore expelled through the opening through the rind made by the knife 103. The places where any such bursting might be expected to occur is through the slots 112 and 173 in the compression cups. By virtue of the peculiar character, shape and close spacing of the fingers or teeth 109 and 162, however, such outward bursting through said slots is reduced to an inconsequential minimum.

An entire cycle of operation on a single whole orange is illustrated in Figs. 5, 6, 7, 10 and 14. The convex bottom face 165 of the cup 99 operates to substantially decrease the space remaining within the fruit as the upper cup approaches the downward limit of its movement, thereby permitting a greater degree of compression of the fruit to be accomplished with a given movement together of the cups 98 and 99. This makes it possible to secure the desired compression of the orange without too great a laceration of the rind by the cup fingers adjacent the plane of inter-digitation.

This plane is indicated in Fig. 7 by line 8—8 and Fig. 8 illustrates how the rind of an orange being compressed is supported in this plane by the fingers of the two cups which completely surround the fruit. Above and below the plane of inter-digitation, however, the rind is supported only by the fingers of one or the other of the cups. Fig. 9 illustrates the manner in which the rind of the fruit is thus supported by the fingers of the lower cup alone in the plane indicated by line 9—9 of Fig. 7. In this view it is seen how the outer surface of the rind R bulges outwardly into the slots 111 between adjacent fingers 109 of the lower cup 98. The spaces between the fingers 109 are so narrow, however, that while the outer surface of the rind R may bulge outwardly into these spaces it is not possible for an unsupported section of the rind to extend outwardly, beyond the adjacent points at which it is supported, a distance equal to the thickness of the rind. This statement is made, of course, with reference to the average thickness of orange rinds as illustrated in Fig. 9. It is thus clear that the fruit is supported everywhere, except in the area of the hole formed in the rind for the escape of juice, so that the juice structure J cannot burst through the rind R and the juice must, therefore, pass through the juice opening formed in the rind by the knife element 101.

The mode of operation of my invention in compressing whole fruit for simultaneously extracting peel oil and juice therefrom is further illustrated in Figs. 15 to 19 where the reaction of the rind to the cups is shown. While the cup fingers combine to support the rind of the fruit in the plane of inter-digitation, as shown in Fig. 8, the friction of the fingers on the rind as these fingers approach and pass each other at that plane rubs the surface of the rind so as to flake off small portions of this. Progressive phases of this action are illustrated in Figs. 15, 16 and 17. In spite of this action, which does not occur universally but only with fruits the rinds of which are comparatively weak, the operation of the invention on Valencia oranges on a commercial scale has been found to result in over 98% of the fruit going through the machine without the juice bursting outwardly through the rind.

Fig. 18 illustrates the manner in which the upper and lower fingers press into the rind of the orange so as to break the oil cells in the rind between the fingers and release the peel oil which spurts out in a mist against the cup fingers and then drains downwardly from these onto the apron 67 and from this into the annular trough 82. Fig. 18 also shows how the friction of each of the fingers against the rind tends to push and buckle up the outer surface portion of the rind just in advance of the area of contact between this finger and the rind.

The button cutter 101 of my invention has distinct advantages in that the inlet to the juice passage formed therein is at the upper edge of the annular knife 103 which is disposed above the bottom of the lower cup 98 a sufficient distance so that peel oil expressed from the rind of the orange will not gain access to the juice passage in the button cutter. On the contrary, the expressed oil will be shut off from the juice passage of the button cutter by the snug seal between annular knife 103 and the rind R of the orange as clearly shown in Fig. 17. Furthermore, the shoulder 104 is made with an outward slope so that any peel oil released from the fruit onto this will drain outwardly and flow downwardly through the slots 111 onto the oil-receiving apron 67 (see Fig. 3). From this it is clear that the peel oil is expressed from the rind of the oranges simultaneously with the juice being expressed therefrom and the juice and peel oil are separately collected.

The button cut from the rind by the button cutter 101, and the juice within the orange are expelled downwardly through the button cutter 101 and the tube 100 into the juice-receiving chamber 90 within the trough 87. From this trough the juice flows from the tube 92 into the juice reservoir 91 from which it is withdrawn through the pipe 93 as it accumulates.

If, as aforementioned, an inert gas is supplied to the reservoir 91, this fills the space above the juice in this reservoir and in the tube 92 and chamber 90, and flows upwardly to escape from the central passages 102 in the button cutters 101 when these passages are not closed by oranges. The atmosphere is thus completely excluded from contact with the orange juice expressed from the oranges downwardly through the passages 102. This feature is no part of the present invention, but is covered by my co-pending application for U. S. Letters Patent Serial No. 543,395, filed July 3, 1944.

As the rotor 48 continues to turn following the completion of the compression step of the process, the roller 133 of each successive mechanism 97 rides upwardly on the lower cam 40 so as to lift the upper cup 99 of this mechanism to its maximum height. As the upper cup starts to rise from its downwardmost position shown in Fig. 10, the downward pressure of the spring 178 imparted through the ejector plates 175 against the orange carcass 122, prevents the latter being lifted by adherence to the upper cup and causes it to remain downwardly resting in the lower cup. At this time, the ejector roller 125 of the carcass ejector 117 of this mechanism 97 comes opposite the rise in cam 20 which lifts this ejector 117, the plates 121 of which engage and lift the carcass 122 as shown in Fig. 14.

This elevation of each carcass 122 comes immediately prior to the extraction mechanism 97 which carries it arriving opposite the carcass removing plate 196 (see Fig. 20). Rotation of the plate 196 is so timed that it swings downwardly and obliquely against this carcass as it comes directly beneath the shaft 184 thereby sweeping the carcass into the chute 197. Immediately following this action, the ejector 117 of this lower cup is lowered by the roller 125 traveling off from over the rise in cam 20, and the cup moves into position under the discharge end of the fruit feeding trough from which it then receives another whole orange.

The fruit which the machines 15 of my invention are provided to handle, varies considerably in diameter. It has been found that there are limits to the range in diameters of fruit which can be efficiently handled in a machine 15 with cups having a given internal diameter. In fact, it has been found preferable to employ three machines with cups differing in internal diameter, first separating the fruit into three groups of sizes and then feeding each of these groups to one of these machines. Thus Fig. 23 illustrates diagrammatically how all the various sizes of fruit are divided into a larger size group 210, a middle size group 211 and a smaller size group 212. The larger size is fed to a machine 15 having cups 213 with an internal diameter suitable to handle these while the machines to which the groups 211 and 212 are fed have cups 214 and 215 respectively, the internal diameters of which are progressively smaller so as to accommodate these to the fruit sizes of the groups fed thereto.

It will be noted that while the cups 213, 214 and 215 vary in internal diameter they are uniform in depth so that no change is necessary in the machines 15 outside of the substitution of one set of cups for another in order to adapt the machine to handle any particular size group.

I will now refer to Figs. 24 and 25 which illustrate a modified type of hole-forming device 228 for use in the machine 15. This device comprises a die 230 which replaces the button cutter 101 in the upper end of the tube 100 in the lower cup 98. This die snugly fits the tube 100 and has a central juice passage 231, and a shoulder 232 which extends out over the upper end of the tube 100. The upper end of the die 230 has an outwardly and downwardly beveled face 233, the outer edge of which lies in the same level as and merges with the bottom of the bowl 110 of the cup 98.

The mode operation of the die 230 is to depend upon the internal hydraulic pressure within the orange due to its compression between the upper and lower cups, to hydraulically die cut a button from the rind of the orange. Fig. 24 illustrates the stage of this operation where the fruit has just been brought into conformity with the cup and the die and before enough pressure has been developed in the fruit to expel a button from the rind.

Fig. 25 illustrates the expulsion of the rind button hydraulically. The button and the juice are forced downwardly through the juice passage 231. The pressure of the rind against the beveled face 233 prevents peel oil expressed from the rind by the cups 98 and 99 having admission to the juice passage 231. The outward and downward slope of the face 233, of course, prevents peel oil deposited thereon from draining into the juice passage. Excepting where fruits are handled having rinds of abnormal thickness the hydraulic button cutting die 230 has been found to perform quite satisfactorily.

A second modified type of hole-forming device 240 and the operation thereof is illustrated in Figs. 26 to 29, inclusive. This device, which has been found preferable on certain types of fruit having large numbers of seeds or a very pulpy juice-bearing structure, comprises a tube 241 which is substituted for the tube 100 and button cutter 101 of the preferred embodiment of the invention.

The tube 241 has fixed in the upper end thereof a plurality of incision forming knives 242 which are preferably disposed radially and meet together at the axis of the tube 241. The upper edges 243 of these knives are sharpened and preferably slope upwardly as shown in Fig. 27. The lower edges 244 of the knives 242 slope upwardly at a steeper angle than the upper edges 243 so as to give a maximum clearance beneath the knives to accommodate seeds and pulpy material passing downwardly through the spaces between the knives and the interior of the tube 241.

As illustrated in Fig. 27, the mode of operation of the hole-forming device 240 begins with the orange resting on the knives 242. Compression of this orange between the cups 98 and 99 first results in impaling the orange on the knives 242 as shown in Fig. 28 thereby forming rind tabs 245. As the upper cup continues downwardly and the hydraulic pressure within the orange builds up, the rind tabs 245, formed by impaling the orange on the knives 242, are bent outwardly as shown in Fig. 29 to produce a plural juice passage through which the juice is expelled downwardly into the tube 241.

Where it is practical to use a hole-forming device such as the button cutter 101, this is preferable as tests have indicated that this device obtains superior results in keeping the peel oil out of the juice. When running the machine 15 on California Valencia oranges, the following results were observed. Equipped with knife devices 240, the peel oil content was .036% average by volume. Equipped with button cutter 101, the peel oil content was .012% average by volume.

The juice and oil yield obtained in operating my method varies somewhat with the speed of rotation of the machine. When operating the machine 15 at 234 cups per minute, for instance, the juice yield was 97.8 gallons per ton and the oil yield (distilled) was 4.92 pounds per ton. When operating at 120 cups per minute, the juice yield was 101 gallons per ton and the oil yield (distilled) was 6.7 pounds per ton.

The amount of juice recovered at 234 cups per minute represented 92.25% of the entire amount of juice in the fruit. The recovery at 120 cups per minute is about 95% of the total.

While my invention may be adapted for use on other citrus fruits, it is here disclosed as designed especially for use with Valencia oranges and other varieties of similar structural characteristics. Considering the maximum speed of rotation of the rotor of the machine 15 as being 240 cups per minute, this will be attained at a speed of 20 R. P. M. where there are twelve extraction units on the rotor as in the machine 15. As each cup passes through a single complete cycle of operation for each revolution of the rotor, this cycle has a period of three seconds. As may be noted in Fig. 1, the shifting of the upper cup 99 of each extraction mechanism downwardly from its uppermost position to its full compression position occurs in a small fraction of the cycle period. In fact, this downward movement of the upper cup is completed in about ⅓ of a second from the time it starts. The compression of the orange between the upper and the lower cups is not necessarily consummated in this brief period as the spring 158 is disposed so that it may yield if sufficient resistance is offered by the orange to the downward movement of the upper cup.

Fig. 4 shows an extraction mechanism just after the cam roller 132 thereof has ridden downward on the upper cam 46 opposite its lower horizontal portion. This view shows the spring 158 compressed by the resistance to compression of an orange between the upper and lower cups of this unit. The compression of the spring 158 results from the fruit stopping the downward movement of the stem 139 while the head 131 continues down as the roller 132 rides onto the lowermost portion of the cam 46. This causes the stop pin 141 to move downwardly away from the upper end of the slot 140 as shown in Fig. 4.

The orange remains under the pressure of the spring 158 throughout the balance of the travel of this extraction unit with the roller 132 against the lower portion of the cam 46. As indicated by the foregoing figures, the longer this period, the larger is the proportion of juice and peel oil which will be extracted from the fruit.

When operating on different sizes of fruit or fruit varying in character so as to require different amounts of pressure to obtain the desired results, an adjustment may be made in the tension of the spring 158 which will vary the pressure required to collapse the spring 158. This adjustment may be effected by unscrewing the screw 154 to withdraw the guide tit 155 from the slot 152 in the threaded bushing 150 and rotating this bushing a desired number of revolutions to either lift or lower the bottom end of the spring 158 and then returning the screw 154 inwardly to replace the tit 155 in the groove 152.

The spring 158 is normally set to apply a pressure of 800 pounds against a piece of fruit being operated upon. By the adjustment noted, this pressure may be increased to as much as 1200 pounds. Spring pressures commonly employed in operating the machine 15 vary between 800 and 1000 pounds. This high pressure is necessary in order to obtain the rapidity of action in the extraction of juice and peel oil and the completeness of extraction by which a commercial volume and degree of efficiency may be attained.

The pressure would be of no avail, however, unless it were applied through an apparatus which would extract the peel oil and juice from the fruit so that these could be recovered separately as well as accomplishing this with exceeding rapidity. It is, therefore, a feature of my invention of great importance that high pressure is applied to the fruit, by the upper and lower cups between which the fruit is compressed, over contact areas which are broad enough so as not to cut through the rind of the fruit but yet with such a close proximity of adjacent contact areas to each other that the rind of the fruit is not able to expand outwardly between adjacent areas of contact a distance equal to the thickness of the rind (considering the latter as constituting the flavedo and albedo components of the orange skin).

These results are attained on Valencia oranges by the machine illustrated, in which the areas of compression, that is the inner compression faces of the fingers, are not any narrower than ⅛ of an inch, with a maximum of approximately ¼ of an inch in width. The spaces between adjacent contact areas in the cups 98 and 99, that is, the spaces in the slots 111 and 173, vary from a little over ⅛ inch to a little over ¼ inch in width. Operating on certain classes of fruit such as grapefruit, it might be preferable in view of the larger size of cups employed and the much thicker and tougher character of the grapefruit skin, to employ fingers somewhat wider and with correspondingly wider slots to accommodate these fingers.

One of the broad principles upon which the success of the present invention is based, is the envelopment of the whole fruit by pressure responsive surfaces along with the formation of a hole in the rind of the fruit which is a clean cut incision restricted to a small area, the means for forming it being so disposed as not to interfere with the complete envelopment of the fruit and complete contact with the balance of the rind of the fruit by these pressure responsive surfaces. Having attained this condition, the final step is to apply pressure through the pressure responsive surfaces substantially uniformly to the rind of the fruit. In my process this is done quickly, and with such power as to constrict the whole fruit to a small fraction of its former volume with a single direct movement. The extraction and separate recovery of commercially satisfactory percentages of the juice and peel oil of the fruit results.

It is not essential that the uniform contact of the enveloping surfaces with the rind be continuous. In fact, it is preferable that the contact be by narrow areas which are separated by narrow spaces. This localizes the pressure on the oil cells of the orange rind which ruptures most of the oil cells releasing the oil. In the preferred embodiment of the apparatus illustrated this mode of operation is effected by the narrow inter-digitating fingers which are separated by narrow slots.

It is characteristic of these fingers and slots that their width is much less than their depth. This provides the necessary closeness of spacing of the pressure areas to prevent the juice structure bursting through the rind. It also provides the strength required for the cups to apply high pressure rapidly to the orange which is an essential step in my process.

Another feature of these fingers is the slight rounding of the inner edges thereof as illustrated in Fig. 9, to render these edges blunt, so that the rind is not cut by these fingers in the juice extracting operation as would be the case if the corners of these edges were left sharp.

It is also desired to point out that the upper end of the tube 241 of the hole forming device 240 extends upwardly above the point where the lower cup fingers join the tube a sufficient distance to prevent the peel oil in the bottom of the cup running over into this tube and thus mixing with the juice during the interval between juice extracting operations.

While there is a snug contact between each orange and the shoulder 104 of the circular cutter 101 during the extraction of juice from this orange so as to prevent juice passing outwardly between the cutter 101 and the hole formed thereby in the orange, a seal is also formed between this hole and the cutter where the hole engages the outer surface of the annular knife 103 which is preferably tapered enough to expand said hole as the rind is impaled on the knife and thus form a very tightly pressed fit between the hole in the rind and this knife.

The taper of the outer surface of the annular knife 103 while sufficient to effect the tightly pressed fit aforesaid, is not great enough to cause the rind of the fruit to be split by the expansion of the hole as the impaling of the fruit on the annular knife 103 progresses.

It is to be noted that citrus fruit such as oranges or grapefruit are spheroidal in shape and that the shape of each cup bowl approximates that of the fruit portion contacted thereby and may therefore be said to be hemispheroidal.

I claim:

1. In a citrus fruit juice extractor the combination of: a pair of fruit supporting and compressing cups the walls of which are slotted to permit interdigitation when said cups are brought together; means for bringing said cups together to enclose and support and compress a whole fruit, said cups being shaped to cause said fruit to conform thereto whereupon said cups support the rind of said fruit at a multiplicity of points sufficiently closely spaced to prevent outward bursting of the juice-bearing structure excepting in a given restricted area; and juice passage means adapted to provide within the aforesaid area a passageway from said fruit through which juice may flow out of said fruit when said fruit is enclosed and compressed as aforesaid.

2. In a citrus fruit juice extractor, the combination of: primary and secondary presser cups; means for causing relative movement between said cups to compress a whole fruit and thereby extract the juice therefrom, each of said cups having a series of narrow slots, said slots being spaced to provide a series of narrow fingers of such width that the fingers of one cup are adapted to have interdigitating relation with the fingers of the other cup when said cups are brought together by said relative movement means, said cups being of a combined depth to completely enclose said fruit at the commencing of said interdigitation and before the approach of said cups places a substantial degree of compression on said fruit, said slots being of such narrow width that said fingers support the rind of said fruit as said cups come into compressing relation with the fruit, so as to prevent the bursting of said rind as the result of said compression; and passage means adapted to penetrate said rind and to provide a passage through which the juice may be expelled from the interior of said fruit by said compression.

3. A method of extracting juice and peel oil from a whole citrus fruit which comprises: forming an opening in the rind of the fruit for the escape of juice therefrom; applying sufficient pressure substantially uniformly to substantially the entire exterior surface of the fruit to squeeze the juice therefrom out of said opening, and to press peel oil from the exterior surface of the rind; isolating said juice and peel oil to prevent intermixing thereof; and separately collecting the juice and peel oil expressed from the fruit.

4. A method of extracting juice and peel oil from a whole citrus fruit which comprises: forming an opening in the rind of said fruit; then applying compressive pressure to the rind of the fruit to reduce the volume of the fruit whereby to force juice from the fruit out of said opening and to press oil from the exterior surface of the rind, said pressure being applied at a plurality of points sufficiently closely spaced to prevent outward bursting of the rind under relatively high internal pressures produced as a result of said compression; isolating said juice and peel oil to prevent intermixing thereof; and separately collecting the juice and peel oil expressed from the fruit.

5. In a citrus fruit juice extractor, the combination of: primary and secondary compressor cups; means for causing relative movement between said cups to compress a whole fruit and thereby extract the juice therefrom, each of said cups having an annular series of fingers which enter into inter-digitating relation when said cups are brought together to entirely enclose said fruit and support the rind thereof along lines sufficiently closely spaced to prevent outward bursting of the rind as a result of said compression; and a penetrating member mounted in one of said cups, said member being adapted to have said fruit pressed thereon by said compressing action to form a passage for the escape of juice from the interior of said fruit, there being a passage opening into the cup in which said penetrating member is mounted to receive peel oil expressed from the rind of the fruit during said compression and conduct it away separately from said juice.

6. In an apparatus for compressing whole citrus fruit the combination of: a rotor; means for rotating said rotor; a series of whole fruit compressing mechanisms disposed about said rotor, each of said mechanisms including an upper compression means and a lower compression means, said compression means of each mechanism being adapted to envelop and compress a whole citrus fruit when brought together; and means for causing relative vertical movement between the upper and lower compression means of each of said mechanisms as said rotor rotates to accomplish the envelopment and compression of whole citrus fruit fed between the upper and lower compression means of said mechanisms.

7. In an apparatus for compressing whole citrus fruit the combination of: a rotor; means for rotating said rotor; a series of whole fruit compressing mechanisms disposed about said rotor, each of said mechanisms including a pair of cups with inter-digitating fingers, said cups being adapted when brought together to envelop and compress a whole citrus fruit; and means for causing relative movement between said cups of each of said mechanisms as said rotor turns, to compress whole citrus fruit fed between the cups of said mechanisms.

8. In an apparatus for compressing whole citrus fruit the combination of: a rotor; means for rotating said rotor; a series of whole fruit compressing mechanisms disposed about said rotor, each of said mechanisms including an upper compression means and a lower compression means, said two compression means of each mechanism being adapted to envelop and compress a whole citrus fruit when brought together; means for causing relative vertical movement between the upper and lower compression means of each of said mechanisms as said rotor rotates to accomplish the envelopment and compression of whole citrus fruit fed between the upper and lower compression means of said mechanisms; means for feeding whole citrus fruit between the upper and lower compression means of said mechanisms; and means for removing the carcasses of said fruit from between said upper and lower compression means following said compression.

9. In an apparatus for compressing whole citrus fruit the combination of: a rotor; means for rotating said rotor; a series of whole fruit compressing mechanisms disposed about said rotor, each of said mechanisms including a pair of cups with inter-digitating fingers, said cups being adapted when brought together to envelop and compress a whole citrus fruit; means for causing relative movement between said cups of each of said mechanisms as said rotor turns, to compress whole citrus fruit fed between the cups of said mechanisms; means for feeding whole citrus fruit between the cups of said mechanisms to cause said fruit to be compressed by said cups by said relative movement; and means for removing the carcasses of said fruit from between said cups following said compression.

10. In an apparatus for compressing whole citrus fruit the combination of: a pair of cups with inter-digitating fingers, said fingers of each cup being separated by slots for receiving the fingers of the other cup, said cups being adapted when shifted together in inter-digitating relation to compress a whole citrus fruit by the application of compressive forces substantially uniformly to practically the entire area of said rind of said fruit to prevent the interior juice-bearing structure of the fruit bursting through said rind where said forces are so applied; and means for ejecting the compressed carcass of said fruit from one of said cups following the compressing operation, said means extending through certain of said slots in said cup to engage said carcass.

11. A combination as in claim 10 in which said fingers and slots lie in radial planes, and in which said ejecting means includes a series of circumferentially spaced pushers; and means to which said pushers are connected which slides relative to said cup to move said pushers between retracted and operatively extended positions.

12. In an apparatus for compressing whole citrus fruit the combination of: a rotor; a series of whole fruit compressing mechanisms disposed about said rotor, each of said mechanisms including an upper compression means and a lower compression means, said compression means of each of said mechanisms being adapted, when brought together, to envelop and compress a whole citrus fruit to extract oil from the rind of the fruit, form a hole in said rind and express juice from said fruit through said hole; means for causing relative vertical movement between the upper and lower compression means of each of said mechanisms as said rotor rotates to accomplish the envelopment and compression of whole citrus fruit fed between the upper and lower compression means of said mechanisms; and means for separately collecting the rind oil and the juice thus extracted from said fruit.

13. In an apparatus for compressing whole citrus fruit the combination of: a rotor; a series of whole fruit compressing mechanisms disposed about said rotor, each of said mechanisms including a pair of cups with interdigitating fingers, said cups being adapted when brought together to envelop and compress a whole citrus fruit, form an opening in said fruit, press the juice from the interior of said fruit out through said opening, and express oil from the rind of said fruit; means for causing relative movement between said cups of each of said mechanisms as said rotor turns, to operate on a whole citrus fruit as aforesaid; means for feeding whole citrus fruit between the cups of said mechanisms; means for removing carcasses of said fruit from between said cups following compression of the fruit by said cups; and means for separately recovering the peel oil and juice extracted from said fruit.

14. In an apparatus for compressing whole citrus fruit the combination of: a pair of cups with interdigitating fingers, said fingers of each cup being separated by slots for receiving the fingers of the other cup, said cups being adapted when shifted together in inter-digitating relation to compress a whole citrus fruit by the application of compressive forces substantially uniformly to practically the entire area of said rind of said fruit to prevent the interior juice-bearing structure of the fruit bursting through said rind where said forces are so applied; and means for ejecting the compressed carcass of said fruit from one of said cups following the compressing operation.

15. In an apparatus for compressing whole citrus fruit the combination of: a pair of cups with inter-digitating fingers, said fingers of each cup being separated by slots for receiving the fingers of the other cup, said cups being adapted when shifted together in inter-digitating relation to compress a whole citrus fruit by the application of compressive forces substantially uniformly to practically the entire area of said rind of said fruit to prevent the interior juice-bearing structure of the fruit bursting through said rind where said forces are so applied; and means for ejecting the compressed carcass of said fruit from one of said cups following the compressing operation, said means extending into the space within said cup to engage and dislodge said carcass therefrom.

16. In a citrus fruit juice extractor the combination of: a pair of fruit supporting and compressing cups, the walls of which are slotted to provide alternate slots and fingers, the fingers of each cup being adapted to enter the slots of the other to accomplish inter-digitation; means for bringing said cups together to enclose and support and compress a whole fruit, said cups being shaped to cause said fruit to conform thereto whereupon said cups support the rind of said fruit at a multiplicity of points sufficiently closely spaced to prevent outward bursting of the juice-bearing structure excepting in a given restricted area, said fingers and said slots being relatively numerous and narrow as compared with their depth radially; and juice passage means adapted to provide within the aforesaid area a passageway from said fruit through which juice may flow out of said fruit when said fruit is enclosed and compressed as aforesaid.

17. In a device for extracting the juice from a whole citrus fruit the combination of: a pair of axially opposed cups each having an annular series of fingers separated by slots, the fingers of each cup being adapted to have inter-digitating relation with those of the other, said fingers and slots being relatively numerous and narrow as compared with their depth radially thereby supporting the entire area of the rind of the fruit at points sufficiently closely adjacent to prevent outward bursting of the juice through the rind when the fruit is compressed by said cups; means for moving said cups together to cause the latter to embrace and compress a whole citrus fruit; and means associated with said cups for providing a passageway through the rind of said fruit to permit the escape of juice therefrom when said fruit is compressed between said cups.

18. In a device for extracting the juice and peel oil from a whole citrus fruit the combination of: a pair of axially opposed cups each having an annular series of fingers separated by slots, the fingers of each cup being disposed in inter-digitating relation with those of the other, said fingers and slots being relatively numerous and narrow as compared with their depth radially; means for moving said cups together to cause the latter to embrace and compress a whole citrus fruit; means associated with said cups for providing a passageway through the rind of said fruit to permit the escape of juice therefrom when said fruit is compressed between said cups; and means for collecting, separately from said juice, the peel oil released from said rind by the pressure of said cups thereagainst.

19. An apparatus for extracting juice and rind oil from whole citrus fruit comprising a fruit supporting cup, means for compressing a piece of fruit disposed in said cup to express juice and rind oil therefrom, there being a juice receiving passageway formed centrally in said cup, the walls of said cup about said passageway having rind oil receiving passages therein which are adapted for receiving and conducting rind oil away from said central juice passageway, the bottom of said cup about said juice passageway making an annular contact with said fruit during said compressing operation to prevent the entry of the rind oil into said juice passageway in said cup, said cup and said compressing means being adapted to conform sufficiently to the rind of said fruit to prevent the juice-bearing structure of said fruit exploding outwardly through said rind elsewhere than through said juice passageway, the pressure produced within said fruit being sufficient to expel a button of rind through said juice passageway thereby forming an opening through said rind, and express a relatively large portion of the juice in said fruit outwardly through said juice passageway.

20. A combination as in claim 19 in which a relatively annular knife is provided in said cup to extend upwardly about said juice passageway, said knife forming an annular incision in said rind to decrease the resistance to the expulsion of said button of said rind by said internal pressure.

21. A method of extracting and separately recovering juice and peel oil from a whole citrus fruit which comprises providing support for all portions of the rind of said fruit outside a relatively small area thereof which support is adequate to prevent local outward bursting of the juice-bearing structure through said rind portions when said structure is subjected to relatively high pressure; while maintaining said support, compressively reducing the volume of the space within the boundaries of said support to produce such a high internal pressure within said fruit as to force a passage through the rind in said area and express the juice from said structure outwardly through said passage, said external pressure on said rind expressing the peel oil therefrom; and separately recovering said oil and said juice.

22. A method of extracting juice from a whole citrus fruit which comprises: forming a plurality of incisions in the rind of said fruit within a relatively restricted area thereof, said incisions meeting at a given point in said area, constricting said fruit to substantially reduce its volume and break down the firm juice-bearing structure within said fruit, thereby bending said rind outwardly adjacent said incisions to form a passage and expel a relatively large portion of said juice outwardly through said passage, said constriction being accomplished by the uniform application of compressive forces simultaneously to all portions of said rind outside said area at points sufficiently close to each other as will prevent the juice-bearing structure exploding outwardly through said rind.

23. A method of extracting juice from whole citrus fruit which comprises: forming a series of incisions in the rind of said fruit within a relatively restricted area thereof, said incisions meeting at a central point in said area and constricting said fruit to substantially reduce its volume and break down the firm juice-bearing structure within said fruit, thereby bending said rind outwardly adjacent to said incisions to form a hole and expel a relatively large portion of said juice outwardly through said hole, said constriction being accomplished by the uniform application of compresive forces simultaneously to all portions of said rind outside said area at points sufficiently close to each other as will prevent the juice-bearing structure exploding outwardly through said rind.

24. An apparatus for extracting juice and rind oil from whole citrus fruit comprising a fruit supporting cup, means for compressing a piece of fruit disposed in said cup to express juice and rind oil therefrom, there being a juice receiving opening formed centrally in said cup, the walls of said cup about said opening having rind oil receiving passages therein which are adapted for receiving and conducting rind oil away from said central juice opening, the bottom of said cup about said juice opening making an annular contact with said fruit during the said compression operation to prevent the entry of rind oil in said juice opening in said cup; and knife means mounted on said cup at the mouth of said juice opening, compression of said fruit in said cup pressing said rind against said knife means and thus forming an incision in said rind, the rind adjacent to said incision being bent outwardly by said compression to form a passage in said rind through which juice is forced by said compression.

25. A combination as in claim 24 in which the portion of the bottom of said cup which makes an annular contact with said fruit comprises an annular wall which extends a short distance above the bottom of said cup to prevent rind oil flowing inwardly from the bottom of said cup into said juice passage during intervals when a fruit is not being compressed in said cup.

26. In a device for extracting the juice from a whole citrus fruit, the combination of: a pair of cups, the walls of which are slotted to provide alternate slots and fingers which permit said cups to have interdigital relation when moved axially towards each other, said cups being adapted when so moved together to enclose said fruit and by pressurally contacting opposite hemispheres of said fruit to cause said hemispheres to closely conform respectively to said cups and thereby adequately support the rind of said fruit against local outward bursting therethrough of the juice bearing structure of said fruit; means adapted to form a hole in said rind when said fruit is pressed thereagainst; and means for applying said cups to said fruit to press said fruit against said hole-forming means to form a hole in said rind, and for pressing said cups against said fruit to cause said cups to support said rind as aforesaid and, while maintaining said support, to reduce the volume of the space occupied by said fruit between said cups and thus expel juice from said fruit through said hole.

27. In a citrus fruit juice extractor, the combination of: a lower fruit supporting and compressing cup the walls of which are slotted radially from the rim to the bottom of said cup to form alternate slots and fingers, said bottom being substantially smaller in diameter than said rim so that the inner surfaces of said fingers converge downwardly, there being a juice hole in said cup bottom, the bottom of said cup being low enough to permit a whole citrus fruit of suitable size for handling by said extractor to be substantially entirely enclosed by said cup when loosely resting therein; an upper fruit supporting and compressing cup which is slotted similarly to said lower cup so as to be capable of having interdigitating relation with the latter when moved downwardly thereon; and power means for moving said upper cup downwardly to enclose the whole fruit resting in the lower cup and compress said fruit, said slots being relatively narrow whereby said cups support the rind of said fruit at points sufficiently closely spaced to prevent the juice bearing structure bursting outwardly through said rind excepting in the area of said hole, said compression forming a juice passage in said rind in said area and expelling juice therethrough.

28. In a citrus fruit juice extractor the combination of: a pair of fruit supporting and compressing cups, the walls of which are slotted radially to form alternate slots and fingers and to permit interdigitation when said cups are brought together; means for bringing said cups together axially to enclose and support and compress a whole fruit, said slots being approximately onequarter of an inch in width and said cups being shaped to cause said fruit to conform thereto, whereupon said cups support the rind of said fruit at a multiplicity of points which are sufficiently closely spaced as to prevent outward bursting of the juice bearing structure through the rind excepting in a given restricted area; and juice passage means adapted to provide within the aforesaid area a passageway communicating with said juice bearing structure and through which juice may flow out of said fruit when said fruit is enclosed and compressed as aforesaid.

29. In combination: a cup, the wall of which is divided by slots into a series of fingers, said cup being adapted to freely receive and enclose a whole citrus fruit; means axially moveable relative to said cup to cooperate therewith to enclose said fruit between said means and said cup and apply pressure to said fruit substantially uniformly over the entire surface of the fruit excepting in a restricted area in the bottom of said cup; passage forming means in said area in the bottom of said cup which is responsive to the compression of said fruit as aforesaid within said cup to form a hole in the rind of said fruit and provide a passage for juice expelled from said fruit through said hole by said pressure; and an ejector for ejecting the carcass of said fruit from said cup following said compression, said ejector extending through slots of said cup to engage said carcass.

30. In combination: a cup, the wall of which is divided by slots into a series of fingers, said cup being adapted to freely receive and enclose a whole citrus fruit; means axially moveable relative to said cup to cooperate therewith to enclose said fruit between said means and said cup and apply pressure to said fruit substantially and uniformly over the entire surface of the fruit excepting in a restricted area in the bottom of said cup; passage forming means in said area in the bottom of said cup which is responsive to the compression of said fruit as aforesaid within said cup to form a hole in the rind of said fruit and provide a passage for juice expelled from said fruit through said hole by said pressure; and an ejector for ejecting the carcass of said fruit from said cup following said compression, said ejector having a circumferentially disposed series of radial members which extend through said slots of said cup to engage said carcass.

31. In combination: a cup, the wall of which is divided by slots into a series of fingers, said cup being adapted to freely receive and enclose a whole citrus fruit; means axially moveable relative to said cup to cooperate therewith to enclose said fruit between said means and said cup and apply pressure to said fruit substantially uniformly over the entire surface of the fruit excepting in a restricted area in the bottom of said cup; passage forming means in said area in the bottom of said cup which is responsive to the compression of said fruit as aforesaid within said cup to form a hole in the rind of said fruit and provide a passage for juice expelled from said fruit through said hole by said pressure; an ejector for ejecting the carcass of said fruit from said cup following said compression, said ejector extending through slots of said cup to engage said carcass; and means for coordinately reciprocating said compression means and said ejector parallel with the axis of said cup to successively compress whole citrus fruits and following each such compression, to strip out of said cup the carcass produced by such compression.

32. In combination: a rotor; a series of units circumferentially provided on said rotor, each of said units comprising a combination as recited in claim 31; means for rotating said rotor; means for actuating said reciprocating means of said units during said rotation; means for feeding a whole fruit into the cup of each of said units prior to said unit beginning a compression operation; and means for engaging the carcass, produced by said compression operation, when said carcass is thereafter stripped out of the cup of said unit, and deflecting said carcass from said rotor.

33. A method of extracting juice and peel oil from a whole citrus fruit which comprises: forming an opening in the rind of the fruit for the escape of juice therefrom; applying compressive forces to the exterior surface of the fruit to squeeze the juice therefrom out of said opening, and to press peel oil from the exterior surface of the rind; distributing said compressive forces to simultaneously bear on such closely adjacent areas over substantially the entire surface of the rind, that they also serve to provide sufficient support to the rind to prevent the juice from bursting through the rind; isolating liberated juice and peel oil to prevent intermixing thereof; and separately collecting said liberated juice and peel oil.

34. In a device for extracting juice from a whole citrus fruit, the combination of a pair of opposed cups having hemispheroidal bowls whose side walls comprise multiple elongated narrow teeth separated by correspondingly narrow slots, the teeth of each cup being aligned with the slots of the other cup for interdigitation, the interiors of said bowls being shaped to approximate the rind surface of the fruit, whereby said bowls readily distort the rind of the fruit into conformation with the inner surfaces of said bowls as the volume of the space enclosed by said bowls is decreased by said interdigitation to equal the volume of said fruit; and mechanism for moving said cups together to first produce said conformation and then continue said interdigitation to radically reduce the volume of said space, there being a hole in at least one of said cups through which the juice may escape from the fruit as said interdigitation proceeds.

35. In a device for extracting the juice from a whole citrus fruit, the combination of: a pair of opposed cups having bowl cavities the annular side wall of each cup comprising a multiplicity of elongated narrow teeth, separated by correspondingly narrow slots, the teeth of each cup moving in the slots of the other cup to unite the bowl cavities of said cups in a contractible fruit compression chamber the walls of which approximate the shape of a whole citrus fruit, when contracting thereabout, said approximation permitting said fruit to conform to said chamber walls and fill said chamber at the point where the volume of the chamber is reduced to equal that of said fruit, said chamber walls now intimately supporting the entire rind outside a small passage area, and preventing the juice structure bursting outward when the space in said chamber is further reduced to compress said fruit; mechanism supporting and moving said cups together; and a juice passage forming device responsive to said mechanism to form a passage in the rind of said fruit within said area through which juice may escape from said fruit during said compression.

36. In a citrus fruit juice extractor the combination of: a pair of fruit supporting and compressing cups the side wall of each of which comprises a multiplicity of closely-spaced circumferentially-thin and radially-wide teeth disposed flatwise to each other and edgewise to the cup bowl, the spacing of the teeth of each cup providing slots which are adapted to closely receive the teeth of the other cup; means for bringing said cups together to enclose and support a whole citrus fruit, said cups being shaped to cause said fruit to conform closely thereto without rupturing the rind thereof, said means then being adapted to bring said cups closer together to radically and rapidly reduce the space filled by said fruit between said cups and thereby compress said fruit to a small fraction of its original volume; and means for cutting a passage in the rind of said fruit through which the juice may escape from said fruit when the latter is compressed as aforesaid.

37. In an apparatus for extracting juice and rind oil from a whole citrus fruit comprising a fruit supporting cup having a hemispheroidal bowl, the shape of which approximates that of a half of said fruit, means conforming with the opposite half of said fruit to press said fruit into said bowl to force the first mentioned half of said fruit into conformation with said bowl and then compress said fruit in said bowl to express juice and rind oil therefrom, there being a juice receiving opening formed axially in said cup, the walls of said cup about said opening having oil drain means for draining oil from said cup and thus preventing oil accumulating and flowing from said cup into said central juice opening, the bottom of said cup surrounding said juice opening making an annular contact with said fruit during said compression operation; and a juice passage cutter provided on said cup at the mouth of said juice opening for cutting a juice passage in said rind opposite said juice opening and communicating therewith.

38. A device for extracting the juice from a whole citrus fruit comprising a pair of compression cups having fruit receiving concavities therein, each of said cups having side walls made up of a multiplicity of elongated narrow teeth separated by correspondingly narrow slots arranged to receive the teeth of the other cup in closely fitting interdigitating relation when the cups are brought together in confronting relation, whereby said teeth bear against the rind of the fruit over closely spaced areas and support the intervening rind areas to prevent the rind from bursting out between said teeth when the cups are brought together upon a whole citrus fruit under high compressive pressure, passage forming means in the lower portion of one of said cups adapted to form a juice discharge passage in the rind of a fruit pressed thereagainst, said last named cup being provided with a juice discharge passageway extending therethrough from said passage forming means, and means for bringing said cups together in interdigitating relation to enclose and forcibly compress a whole citrus fruit therebetween whereby to press said fruit against said passage forming means to form a discharge passage in the fruit rind and to express the juice from the fruit through said passage.

39. A device for extracting the juice from a whole citrus fruit comprising a pair of compression cups having fruit receiving concavities therein, each of said cups having side walls made up of a multiplicity of elongated narrow teeth separated by correspondingly narrow slots arranged to receive the teeth of the other cup in closely fitting interdigitating relation when the cups are brought together in confronting relation, whereby said teeth bear against the rind of the fruit over closely spaced areas and support the intervening rind areas to prevent the rind from bursting out between said teeth when the cups are brought together upon a whole citrus fruit under high compressive pressure, passage forming means in the lower portion of one of said cups adapted to form a juice discharge passage in the rind of a fruit pressed thereagainst, said last named cup being provided with a juice discharge passageway extending therethrough from said passage forming means, means for bringing said cups together in interdigitating relation to enclose and forcibly compress a whole citrus fruit therebetween whereby to press said fruit against said passage forming means to form a discharge passage in the fruit rind and to express the juice from the fruit through said passage, and an ejector associated with at least one of said cups for ejecting the fruit carcass from the cup concavity following the juice expressing operation.

40. A device for extracting the juice from a whole citrus fruit comprising a pair of compression cups having fruit receiving concavities therein, each of said cups having side walls made up of a multiplicity of elongated narrow teeth separated by correspondingly narrow slots arranged to receive the teeth of the other cup in closely fitting interdigitating relation when the cups are brought together in confronting relation, whereby said teeth bear against the rind of the fruit over closely spaced areas and support the intervening rind areas to prevent the rind from bursting out between said teeth when the cups are brought together upon a whole citrus fruit under high compressive pressure, a die hole in the lower portion of one of said cups for forming a juice discharge passage in the rind of a whole citrus fruit when the latter is pressed thereagainst under high pressure, said last named cup being provided with a juice discharge passageway extending therethrough from said die hole, and means for bringing said cups together in interdigitating relation to enclose and forcibly compress a whole citrus fruit therebetween, whereby to press said fruit against said die hole to form a juice discharge passage in the fruit rind and to express the juice from the fruit through said passage.

41. A device for extracting the juice from a whole citrus fruit comprising a pair of compression cups having fruit receiving concavities therein, each of said cups having side walls made up of a multiplicity of elongated narrow teeth separated by correspondingly narrow slots arranged to receive the teeth of the other cup in closely fitting interdigitating relation when the cups are brought together in confronting relation, whereby said teeth bear against the rind of the fruit over closely spaced areas and support the intervening rind areas to prevent the rind from bursting out between said teeth when the cups are brought together upon a whole citrus fruit under high compressive pressure, a knife blade projecting into one of said cups to cut a juice discharge passage in the rind of a fruit pressed thereagainst, said last named cup being provided with a juice discharge passageway extending therethrough from said knife blade, and means for bringing said cups together in interdigitating relation to enclose and forcibly compress a whole citrus fruit therebetween whereby to press said fruit against said knife blade to cut a juice discharge passage in the fruit rind and to express the juice from the fruit through said passage.

42. A device for extracting the juice from a whole citrus fruit comprising a pair of compression cups having fruit receiving concavities therein, each of said cups having side walls made up of a multiplicity of elongated narrow teeth separated by correspondingly narrow slots arranged to receive the teeth of the other cup in closely fitting interdigitating relation when the cups are brought together in confroning relation, whereby said teeth bear against the rind of the fruit over closely spaced areas and support the intervening rind areas to prevent the rind from bursting out between said teeth when the cups are brought together upon a whole citrus fruit under high compressive pressure, a tubular cutter projecting upwardly from the lower portion of one of said cups for a distance of only a small fraction of the depth of the cup concavity in which it is disposed, said last named cup being provided with a juice discharge passageway extending therethrough from said cutter, and means for bringing said cups together in interdigitating relation to enclose and forcibly compress a whole citrus fruit therebeween whereby to press said fruit against said cutter to cut a juice discharge passage in the fruit rind and to express the juice from the fruit through said passage.

43. In a device for extracting juice from whole citrus fruit, the combination of a pair of opposed cups having hemispheroidal bowls whose side walls comprise a multiplicity of elongated narrow teeth separated by correspondingly narrow slots the teeth of each cup being aligned with the slots of the other cup for interdigitation and the interior of said bowls being shaped to conformably contact substantially the entire outer surface of the whole fruit upon initial interdigitation of said teeth, the slots between the teeth being formed to permit progressive interdigitation of said teeth to express the juice from the fruit without the fruit bursting between the teeth, and a passage communicating with the interior of at least one of said cups through which the juice may escape from the fruit as such interdigitation proceeds.

WILBUR A. PIPKIN.

REFERENCES CITED

The following references are of record in the file of this patent:

UNITED STATES PATENTS

| Number | Name | Date |
| --- | --- | --- |
| 1,960,501 | Maull | May 29, 1934 |
| 1,889,883 | Cody | Dec. 6, 1932 |
| 1,925,196 | Maull | Sept. 5, 1933 |

FOREIGN PATENTS

| Number | Country | Date |
| --- | --- | --- |
| 768,115 | France | May 14, 1934 |
| 279,632 | Italy | Nov. 18, 1930 |